United States Patent [19]
Cotter

[11] Patent Number: 4,665,524
[45] Date of Patent: May 12, 1987

[54] MODE LOCKED LASER LIGHT SOURCES

[75] Inventor: David Cotter, Woodbridge, England

[73] Assignee: British Telecommunications plc, London, England

[21] Appl. No.: 737,451

[22] Filed: May 24, 1985

[30] Foreign Application Priority Data

May 25, 1984 [GB] United Kingdom ............... 8413502

[51] Int. Cl.⁴ ............................................. H01S 3/098
[52] U.S. Cl. ......................................... 372/18; 372/13; 372/29; 372/25; 372/38; 372/82
[58] Field of Search ............... 372/18, 13, 29, 710; 376/25, 82, 38

[56]  References Cited
U.S. PATENT DOCUMENTS

| 3,869,680 | 3/1975 | Fletcher et al. | 372/18 |
| 4,044,316 | 8/1977 | Kennedy | 372/18 |
| 4,485,473 | 11/1984 | Tang et al. | 372/18 |

FOREIGN PATENT DOCUMENTS 1255807 12/1968 United Kingdom .
1321389 6/1971 United Kingdom .
1495847 8/1975 United Kingdom .

OTHER PUBLICATIONS

Optics Communications, "Highly Stable Acousto-Optic Mode-Locking Using Active Feedback", by H. Klann and J. Kuhl, pp. 390–392, vol. 38, No. 5.6, dated Sep. 1, 1981.

Primary Examiner—Leon Scott, Jr.
Attorney, Agent, or Firm—Nixon & Vanderhye

[57] ABSTRACT

A mode-locked laser light source, i.e. a light source in which resonant longitudinal modes of the laser cavity are synchronized in phase to produce a pulsed laser output, is provided with an optical phase-lock loop, to lock the optical output pulse train to the mode-locking radio frequency drive signal. The invention provides a highly stable laser source for light pulses of picoseconds duration.

15 Claims, 4 Drawing Figures

MODE LOCKED LASER LIGHT SOURCES

This invention relates to light sources employing mode-locked lasers and in particular actively mode-locked lasers.

The term "mode locking" herein is to be understood as referring to the process by which resonant longitudinal modes of a laser cavity are synchronized in phase, so as to produce a train of light pulses in the laser output. For the avoidance of doubt, it is to be understood that the terms "light" and "optical" as used herein refer generically to electromagnetic radiation of wavelengths such that a stimulated emission source for such radiation would be referred to as a laser. The terms "light" and "optical" are to be understood as including, in particular, electromagnetic radiation in the wavelength range 0.1 to 10 $\mu$m.

A circuit arrangement for providing a stable RF drive signal to the acousto-optic modulator of a mode-locked laser operated to produce pico-second light pulses is described, for example, in "Highly stable acousto-optic mode-locking using active feedback", H Klann, J Juhl, and D von der Linde, Optics Communications, Vol 38, number 5/6, 1 Sept. 1981, pp 390–392. Stability of the circuit is achieved by locking the resonant frequency of the acousto-optic modulator to the frequency of the RF drive signal. The frequency lock loop consists of an electrical feedback loop from the RF input of the modulator to a voltage controlled attenuator which controls the signal strength of the RF signal applied to the modulator. The input of the attenuator is connected to the output of the generator for the RF drive signal for the modulator. A bidirectional coupler directs a fraction of the RF power supplied to the modulator and a fraction of the RF power reflected from the modulator to a phase detector. The output error signal of the phase detector controls the voltage controlled attenuator.

A different approach to achieving stabilisation of the mode-locked lasers is proposed in U.S. Pat. No. 3,869,680 (James C. Fletcher et al), the proposal there being to provide dual mode-locking by including in the laser cavity two optical mode-locking elements in series. A loss-modulator provides one of these elements, and a phase-modulator the other. A small fraction of the optical output signal is employed to control a voltage controlled oscillator which provides the drive signal to both modulators.

Yet another proposal for stabilising the output of mode-locked lasers is disclosed in "Stabilisation of the active synchronisation mode in an Argon laser", I. I. Vasiliev et al, 8164 Instrument and Experimental Techniques, Vol. 25 (1982), May-June, No. 3, Part 2, New York, USA.

The present invention aims to provide mode-locked laser light sources of improved stability.

According to the present invention a mode-locked laser light source comprises a laser having a laser cavity, a radio frequency (RF) source of high spectral purity, and means to mode-lock resonant longitudinal modes of the laser cavity when the mode-locking means are driven by a drive signal provided by or derived from an output signal of the radio frequency source thereby to generate a train of optical output pulses, and further comprises optical phase lock means including photo detector means and phase detector means to detect and lock respectively the optical output pulse train to a radio frequency signal provided by or derived from said output signal.

Preferably the optical signal is converted into an electrical signal, which is compared with a signal derived from said RF-source, and the phase error signal obtained from this comparison is employed to control the phase of the RF signal applied to an acousto-optic modulator.

The phase of the applied RF signal can conveniently be controlled by means of an integrated electronic phase shifter interposed between the RF source and the acousto-optic modulator.

Alternatively the phase error signal may be employed to control the RF power applied to the modulator. The applied RF power may conveniently be controlled by means of a voltage controlled attenuator.

The optical pulse train may, for example, be detected with the aid of a beam splitter located at the optical output of the laser light source. Instead of a beam splitter, another suitable technique for detecting the output pulses may be employed, such as, for example, using a less than 100 percent reflecting back mirror to the laser cavity.

Said laser may be a continuous wave (cw) gas laser, e.g. a Argon ion laser, or a cw solid state laser such as for example a Nd:YAG laser.

The optical phase lock loop may be employed instead of, or in addition to, a frequency locking or other circuit for stabilizing the resonant frequency of the acousto-optic modulator.

Where the optical phase lock loop is employed in addition to e.g. an electrical phase lock loop stabilizing the resonant frequency of the acousto-optic modulator source, the phase error signal derived in the phase detector of the optical phase lock loop may be superimposed on the control signal to the voltage controlled attenuator. Alternatively, the phase error signal may be used to control an RF phase shifter connected in series with the voltage controlled attenuator, preferably intermediate between the RF source and the voltage controlled attenuator.

The active phase-stabilisation of the present invention may also be employed with semiconductor lasers such as, for example, gain-modulated mode-locked semiconductor lasers. In this case the RF drive signal may be superimposed directly onto the DC bias current of the semiconductor laser.

A preferred application of the invention is in the generation of pulses of durations shorter than 1 pico second by employing a laser light source according to the present invention as a pump source for synchronously pumping a further laser, which may conveniently be a tunable dye laser or a colour centre laser. Synchronously pumped mode-locked dye lasers and colour centre lasers are attractive as sources for very short pulses because of their wide tuning ranges through and often beyond the visible spectrum and their high average power. Particularly if combined with pulse shortening techniques using, e.g. the non-linear properties of optical fibres, pulses of less than 1 picosecond are readily achievable. The stability of the pump source is critical in such applications and the present invention provides a laser source having the required quality. Moreover optical phase-locking arrangement as provided by the present invention has the ability to compensate for phase perturbations due to other causes such as mechanical vibration of the laser cavity and instabilities in the gain medium (e.g. plasma instabilities or thermal lensing). The properties of the mode-locking process are such that by phase-locking the mode-locked pulse repetition frequency to an RF source of high spectral purity the temporal coherence of the laser output is increased giving cleaner pulses with much reduced timing jitter.

The present invention will now be explained further by way of selected embodiments illustrated by the accompanying drawings, of which:

Figure 1:
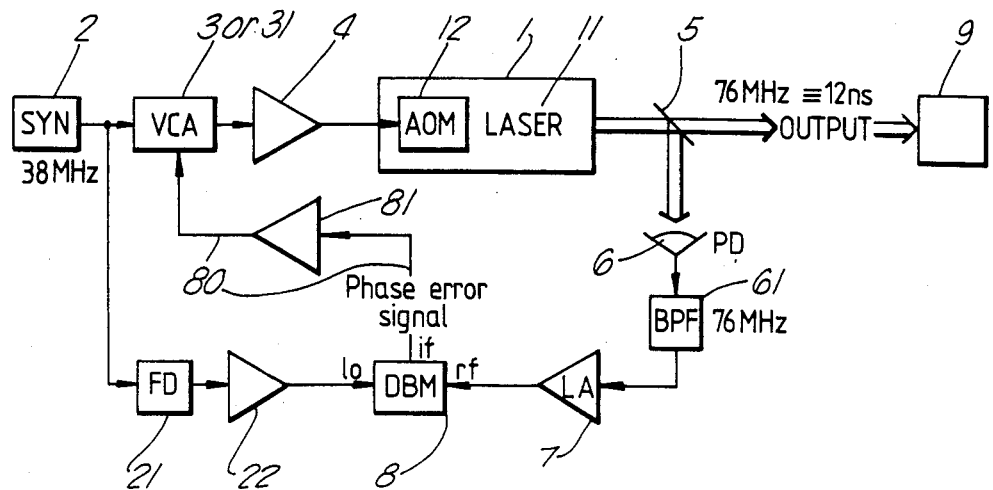
FIG. 1 is a schematic block diagram of a laser source employing an optical feedback loop according to the present invention.

Referring first to FIG. 1, a laser source to provide narrow pulsewidth output pulses at a repetition rate of 76 MHz comprises an acousto-optically mode-locked laser 1 comprising a laser cavity 11 and an acousto-optic prism modulator (AOM) 12. The laser 1 is a CR18 argon-ion laser commercially available from Coherent Inc. operating nominally at 514.5 nm, and the AOM 12 is a standard acousto-optic modulator available from Harris Corporation.

An RF source 2 generating a sine wave of high spectral purity at a frequency equal to half the laser pulse repetition rate is connected via a voltage controlled attenuator 3, such as a commercially available thin film attenuator, and an amplifier 4 to the AOM 12. Instead of a voltage controlled attenuator to control the power of the RF signal, an integrated electronic phase shifter (such as 31 of FIG. 3) may be employed to control the phase of the RF signal.

Placed in the light output beam of the laser 1 is a beam splitter 5 which directs a predetermined fraction of the light output onto a photo detector 6. The photo detector 6, (e.g. silicon photodetector type BPX65), converts the incident light into a corresponding electrical signal which passes through a bandpass filter 61 and a limiting amplifier (LA) 7 to a phase detector 8. A double balanced mixer (DBM) constitutes a suitable phase detector 8.

The DBM (e.g. Microcircuits type RPD-1) receives as one input, the "RF input", the signal from the photo detector 6, and as a second input, the "local oscillator input", a signal which is derived from the RF source 2 output signal by frequency doubling in a frequency doubler 21 and amplification in an amplifier 22. The output of the DBM 8 is a phase error signal indicative of the phase difference between the RF input and the local oscillator input, and hence between the RF drive signal and the optical output pulses of the laser 1. The error signal is fed along line 80 via an operational amplifier 81, to the voltage controlled attenuator 3 to control attenuation therein of the RF drive signal. The operational amplifier 81 was chosen to provide 80 dB loop gain at DC, more than 0 dB loop gain in a band from DC to 100 kHz, and notch filter characteristics which provide approximately 3 dB attenuation at about 5 kHz.

It should be noted that it is important to minimise the inevitable amplitude-to-phase modulation conversion in the RF circuitry and phase detector. If AM-PM conversion occurs, then any intensity fluctuations of the laser will result in spurious phase error signals. It is essential, therefore, to adjust the various RF phase delays in the circuit so that the operating point for the DBM 8 is as close as possible to a null voltage at the IF port. Under these conditions AM-PM conversion in the DBM 8 will be minimised. The RF phase adjustment can be made, for example by selecting the lengths of interconnecting cables appropriately, or more conveniently by including a high-stability coaxial phase-shifting device (not shown) in an input to the DBM 8.

An important application of the laser source 1 is to provide a pump laser for a further laser 9, which may, for example, be a tunable dye laser, or a colour centre laser, to produce light pulses of durations of 10 pico seconds or less. Commercially available dye lasers usually operate in a wavelength range of between 0.3 to 1.8 $\mu$m and, pumped by the aforementioned Argon ion laser at 514.5 nm, are readily tunable between 0.56 and 0.64 $\mu$m. In the case of colour centre lasers operation between 0.8 and 3.65 $\mu$m is currently possible by selecting an appropriate pump laser.

The arrangement of FIG. 1 was initially employed to investigate the phase fluctuations of the pulse train generated by acousto-optic mode-locking in an argon ion laser. The experiments indicated that small amplitude fluctuations of the RF power dissipated in the modulator 12 result in phase fluctuations of the optical pulse train, and it would seem that this AM (amplitude modulation) to PM (phase modulation) conversion is an important factor in determining the quality of mode-locking. The arrangement of FIG. 1, without the feed back control path 80 was used to detect phase fluctuations in an unmodified Coherent CR-18 argon-ion laser 1 (514.5 nm) containing a standard acousto-optic prism modulator 12. The mode-locked laser pulse train was detected by means of the beam splitter 5 and the photo detector 6, and the RF signal at 76 MHz corresponding to the mode-locked pulse repetition frequency was extracted by means of the bandpass filter 61. The signal so derived was compared in phase with the frequency-doubled output of a highly-coherent RF source 2 (Programmed Test Sources PTS200). Frequency doubling is necessary because in acousto-optic mode-locking the applied RF frequency is normally equal to half the mode-locked pulse repetition frequency. The RF power was varied using a thin film voltage-controlled attenuator 3.

Figure 2:
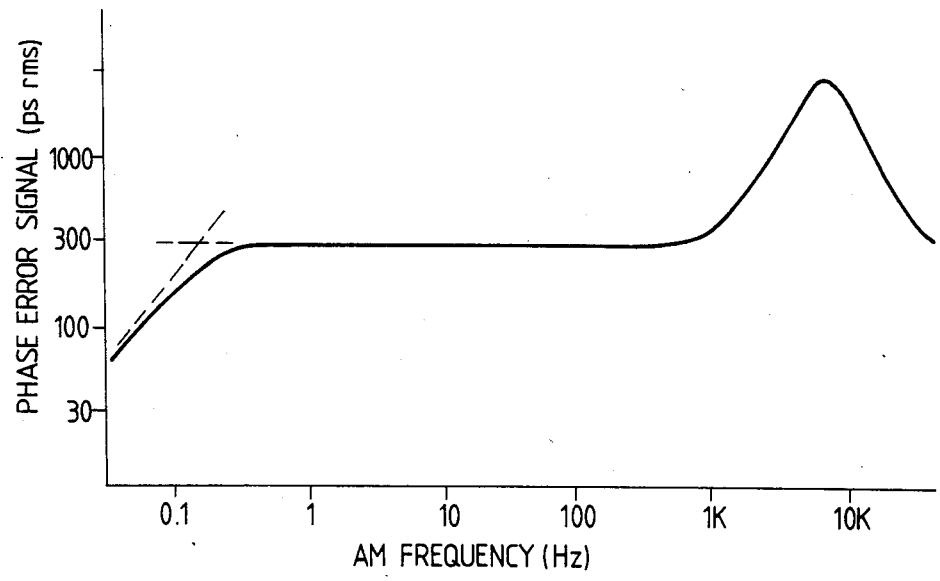
FIG. 2 is a graph illustrating the measured phase error as a function of the frequency of the amplitude modulation of the RF drive signal applied to the modulator.

FIG. 2 shows the phase error signal measured for 1.9 dB peak-peak RF amplitude modulation, as a function of modulation frequency. The low frequency roll-off below 0.15 Hz is characteristic of the $-1$ s thermal time constant of the modulator prism. The position and intensity of the resonant peak at $-6$ kHz depends on the RF power dissipation.

It has been known for some time that temperature fluctuations in the acousto-optic modulator lead to unstable mode-locking. This can now be understood on the basis of FIG. 2. Temperature fluctuations cause a shift in the acoustic resonance frequency, leading to changes in the RF power dissipated in the modulator 12 and hence to phase fluctuations. The present invention provides for compensation for these fluctuations by using the feedback control line 80 to phase-lock the optical output of the laser 1 to the RF output of the source 2. This is a more direct approach to stabilisation of mode-locked lasers than previous methods based on negative-feedback power stabilisation such as described by S Kishida et al in Optics Letters, Vol 5, 1980, p 191, or frequency-locking the modulator acoustic resonance as described in the aforementioned article by Klan et al, or employing dual mode locking as disclosed in U.S. Pat. No. 3,869,680. Moreover the optical phase-lock technique according to the present invention has the ability to compensate for phase perturbations due to other causes such as mechanical vibration of the laser cavity and instabilities in the gain medium (e.g. plasma instabilities or thermal lensing). The properties of the mode-locking process are such that by phase-locking the mode-locked pulse repetition frequency to an RF source of high spectral purity the temporal coherence of the laser output is increased giving cleaner pulses with much reduced timing jitter. In preliminary trials better than 30 dB low-frequency phase noise suppression has been obtained.

As regards stability of operation a mode-locked laser arranged according to FIG. 1, but employing a phase shifter in place of the voltage controlled attenuator, and operating with the aforementioned Argon ion laser at 514.5 nm has yielded stabilization of the output pulse train with respect to the RF source 2 to within ±300 fs (femto seconds), for pump laser pulses of 80 ps duration, over extended periods of the order of one day.

In order to adapt the arrangement of FIG. 1 for use with a solid-state Nd:YAG cw-laser it becomes necessary to modify the control loop by limiting its loop bandwidth to approximately 10 kHz. This modification, which can readily be achieved for example by arranging for the circuit to have a single dominant RC pole, mitigates the effects of the natural relaxation oscillations of the laser resulting from the long radiation lifetimes of the upper lasing level. Thus modified, the arrangement of FIG. 1 was successfully employed to obtain stable laser output pulses of less than 60 ps duration with timing fluctuations less than 1 ps, over several hours of operation.

Figure 3:
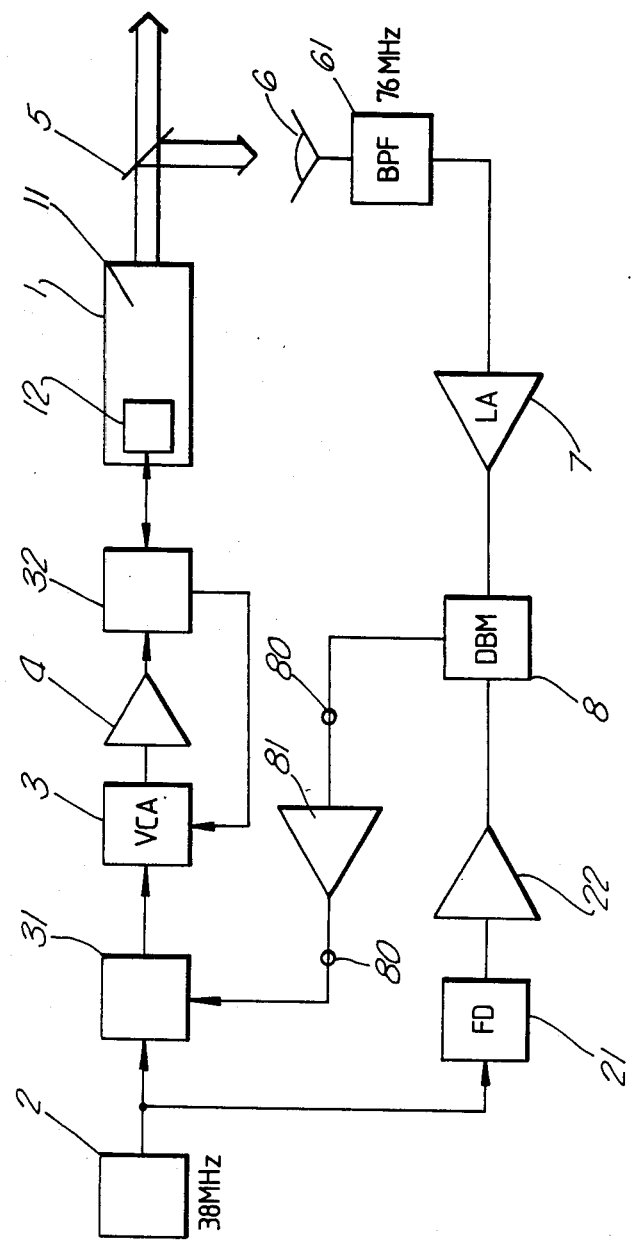
FIG. 3 is a schematic block diagram of a laser light source employing an optical and an electrical feedback loop.

Referring now to FIG. 3, an alternative proposal for a laser source employing the present invention is shown there in block diagram form, comprising an optical phase-lock loop and an electrical phase-lock loop.

With one exception the optical phase-lock loop comprises the same components, labelled by the same reference numerals, as the optical phase-lock loop of FIG. 1. The circuit differs from that of FIG. 1 primarily in that two feed back loops are provided. One of them is a fast acting optical phase lock loop according to the invention, comprising a beam splitter, a photodetector 6 and a band pass filter 61 providing one input to the phase detector 8, the other feed back loop is a slower electrical phase lock loop arranged to provide frequency locking of the resonant frequency of the acousto-optic modulator 12 the modulator drive signal by controlling the voltage controlled attenuator 3. In contrast with the circuit of FIG. 1, the optical phase lock error signal is now employed to control an electronic phase shifter 31, which controls the phase of the RF signal applied to the acousto-optic modulator 12 via the electrical phase lock loop 3, 32. The electrical phase lock loop may operate in the manner described in the aforementioned article by Klann et al. Employing a hybrid stabilisation scheme the arrangement of FIG. 3 may enable an increase in the locking bandwidth.

Figure 4:
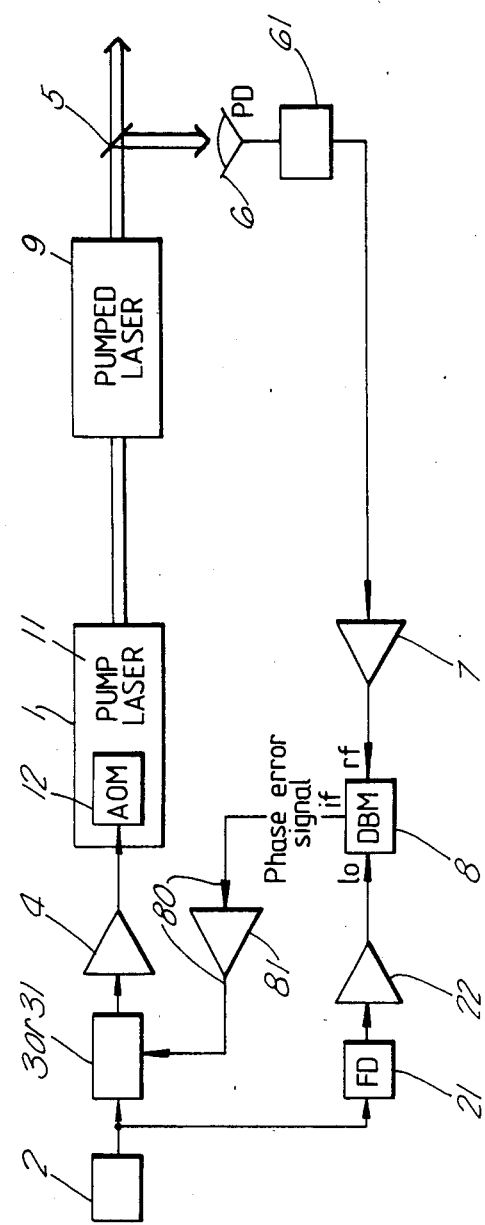
FIG. 4 is a schematic block diagram of a modified form of the laser source of FIG. 1.

Referring now to FIG. 4, a modified form of the arrangement illustrated by FIG. 1 employs optical phase locking according to the present invention by deriving the RF input signal to the phase detector 8 from the laser output of the pumped laser 9 rather than from the laser output of the pumping laser 1. In all other respects the arrangement may be identical with that of FIG. 1 and will be understood without further explanation.

A further advantage of the optical phase lock technique according to the invention is that it can be implemented without any modification of the optical laser cavity itself.

It should be observed that the present invention readily lends itself to producing accurately synchronised pulses from several mode-locked lasers by phase-locking each laser to a common RF-source 2.

I claim:

1. A mode-locked laser light source comprising:
   a laser having a laser cavity,
   a radio frequency source of high spectral purity,
   means for mode-locking resonant longitudinal modes of the laser cavity when the mode-locking means is driven by a drive signal derived from an output signal of the radio frequency source, and
   optical phase-lock means including light detecting means and phase detecting means for detecting and locking respectively an optical output pulse train to a radio frequency signal derived from said output signal.

2. A laser light source as claimed in claim 1 wherein a variable attenuation means is provided to control the magnitude of the drive signal and wherein the variable attenuation means is controlled by said optical phase lock means.

3. A laser light source as claimed in claim 1 wherein electronic phase shift means is provided to control the phase of the drive signal, and wherein the phase shift means is controlled by said optical phase lock means.

4. A laser light source as claimed in claim 1, wherein the laser cavity includes said mode-locking means which comprises acousto-optic modulator.

5. A light source according to claim 1 wherein said laser is a solid state laser.

6. A light source according to claim 1 wherein said laser is a gas laser.

7. A laser light source as claimed in claim 1 wherein said laser is a gain-modulated semiconductor laser.

8. A light source as claimed in claim 1 comprising said laser and a further laser, wherein said laser operates as a synchronous pump laser for the further laser.

9. A light source according to claim 8 wherein said further laser is a dye laser.

10. A light source according to claim 8 wherein said further laser is a colour centre laser.

11. A laser light source as claimed in claim 1 wherein said phase detector means comprises a double balanced mixer.

12. A method of operating a mode-locked laser light source comprising the steps of mode locking a laser to the resonant longitudinal modes of its laser cavity, detecting an optical pulse train thereby generated, and phase-locking the optical pulse train to a radio frequency signal of high spectral purity.

13. A mode-locking laser light source, comprising: a radio frequency source having a circuit of high spectral purity operating at a pre-determined operating frequency, means to control phase and/or magnitude of a radio frequency drive signal for mode-locking said light source, and optical phase lock means to control the drive signal control means.

14. A circuit as claimed in claim 13, comprising further circuit means to stabilize the radio frequency drive signal.

15. A circuit as claimed in claim 13 wherein the phase lock means have a loop bandwidth of less than 10 kHz.

* * * * *